United States Patent [19]

Douglas

[11] Patent Number: 4,778,634
[45] Date of Patent: Oct. 18, 1988

[54] PROCESS FOR THE MANUFACTURE OF POROUS FILM

[75] Inventor: Noel L. Douglas, Chippewa Falls, Wis.

[73] Assignee: El Paso Products Company, Odessa, Tex.

[21] Appl. No.: 110,916

[22] Filed: Oct. 21, 1987

Related U.S. Application Data

[63] Continuation-in-part of Ser. No. 892,667, Aug. 4, 1986, abandoned.

[51] Int. Cl.$^4$ .................. B29C 59/04; B29C 71/04
[52] U.S. Cl. .................................. 264/22; 51/289 R; 264/154; 264/162; 264/284; 264/340; 425/174.8 E
[58] Field of Search ............... 264/22, 41, 154, 162, 264/340, DIG. 47, DIG. 62, 139, 284; 425/174.8 E; 51/289 R

[56] References Cited

U.S. PATENT DOCUMENTS

| | | |
|---|---|---|
| 3,073,304 | 1/1963 | Schaar . |
| 3,302,501 | 2/1967 | Greene ..................... 264/DIG. 47 |
| 3,718,059 | 2/1973 | Clayton ......................... 264/154 X |
| 3,880,966 | 4/1975 | Zimmerman et al. ............ 264/22 X |
| 3,880,969 | 4/1975 | Latos ...................................... 264/44 |
| 4,024,038 | 5/1977 | Luc ................................... 264/22 X |
| 4,351,784 | 9/1982 | Thomas et al. ......................... 264/22 |
| 4,353,799 | 10/1982 | Leonard ............................ 264/22 X |
| 4,364,985 | 12/1982 | Tokuyama et al. ............. 264/340 X |
| 4,412,960 | 11/1983 | Goldman et al. ...................... 264/22 |
| 4,456,570 | 6/1984 | Thomas et al. ........................ 264/22 |
| 4,472,328 | 9/1984 | Sugimoto et al. .................... 264/41 |
| 4,563,316 | 1/1986 | Isaka et al. ............................ 264/22 |

FOREIGN PATENT DOCUMENTS

| | | | |
|---|---|---|---|
| 39-4328 | 4/1964 | Japan .................................... 264/22 |
| 46-41480 | 12/1971 | Japan .................................... 264/22 |
| 47-40863 | 10/1972 | Japan .................................... 264/22 |
| 48-28789 | 9/1973 | Japan ......................... 264/DIG. 47 |
| 51-8377 | 1/1976 | Japan .................................... 264/22 |
| 51-48789 | 4/1976 | Japan .................................... 264/41 |
| 56-7851 | 2/1981 | Japan .................................... 264/22 |
| 921276 | 3/1963 | United Kingdom ................ 264/340 |
| 2151538 | 7/1985 | United Kingdom . |

Primary Examiner—Jeffery Thurlow
Assistant Examiner—Leo B. Tentoni
Attorney, Agent, or Firm—Fred S. Valles; Margareta LeMaire

[57] ABSTRACT

A vapor and liquid permeable porous film suitable for disposable sanitary apparel structures is produced by first abrading an unoriented film by passing it through at least one set of at least two cooperating nip rollers, each having an abrasive grit surface and then subjecting the unoriented abraded film to a corona treatment.

8 Claims, 1 Drawing Sheet

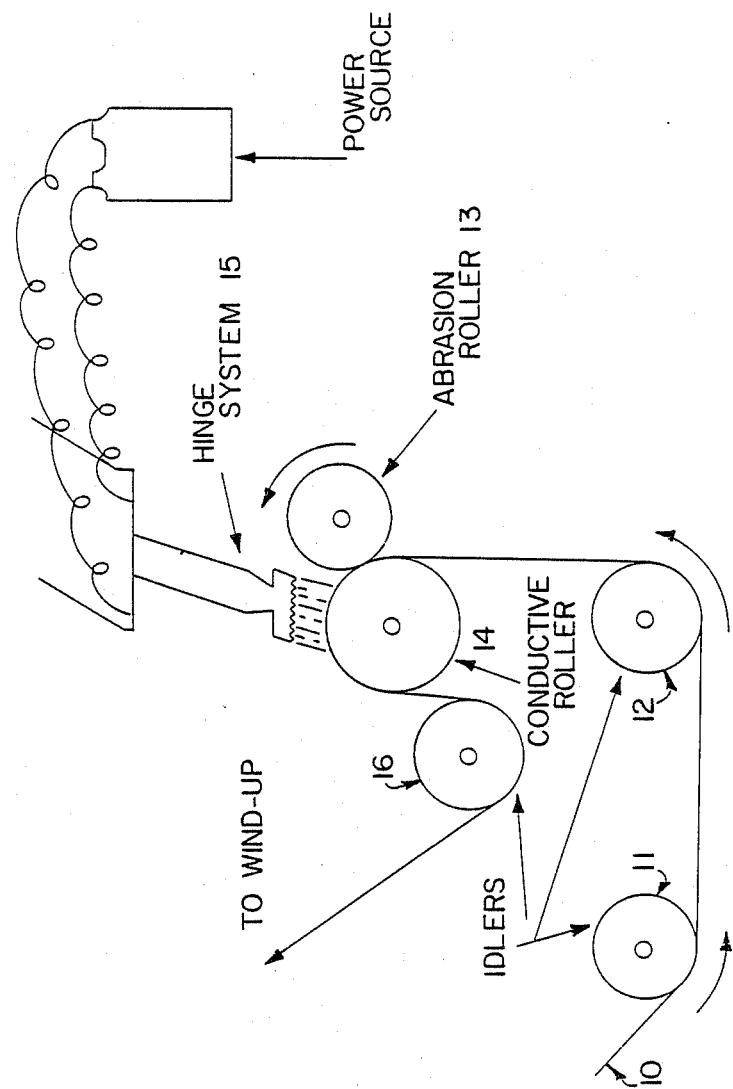

PROCESS FOR THE MANUFACTURE OF POROUS FILM

This application is a continuation-in-part of application Ser. No. 892,667 filed Aug. 4, 1986 now abandoned. It is also related in subject matter to copending applications Ser. No. 92,498 and Ser. No. 92,499, both filed on Sept. 3, 1987.

BACKGROUND OF THE INVENTION

Porous plastic films can be grouped into two different types: (1) macroporous films which are both vapor and liquid permeable and (2) microporous films which are vapor permeable but impermeable to liquids.

Various processes have been disclosed for the manufacture of porous films of both types, all of them involving the formation of pores or perforations extending through the film from one film surface to the other.

One group of such processes entail the formation of an unfilled thermoplastic resin film and then perforating or piercing the film during its passage through the nip of two rollers. For instance, in the process of U.S. Pat. No. 3,302,501, the piercing objects are pins or needle-like projections extending from the surface of one or both rollers. Other processes utilize pairs of rollers, one of these having a smooth, often heated surface, and the other having either projections in its surface as in U.S. Pat. No. 3,073,304 or an abrasive surface coating as in U.S. Pat. No. 3,718,059. The latter processes have not been entirely successful because of the manufacturing cost of the rollers having surface projections and also because of operational problems causing undesired large variations in the film pore diameters. In addition, the improvements in the moisture vapor transmission rates have been less than desired using the smooth pressure roller techniques.

A second group of such perforation processes employs differential pressure, e.g., vacuum, between the surfaces of a heated film to be drawn into the openings of the screen and thereby become perforated. Such processes are disclosed in U.S. Pat. Nos. 4,351,784 and 4,456,570. The resulting perforated films are macroporous and are liquid permeable.

A third group of processes accomplish the perforation by first forming a film of an incompatible polymer matrix, either polymer-to-filler as in U.S. Pat. No. 4,472,328 and British Application No. 2,151,538, or incompatible polymer-to-polymer as in Japanese Patent No. 73-28789, and then stretching the film in one or more directions causing the formation of microtears in the film.

There is also a process disclosed in U.S. Pat. No. 4,364,985 for preparing a porous microfilled thermoplastic film, wherein the inorganic filler particles are required to have an effective diameter larger than the thickness of the film. Small spaces are formed around the particles and when the filled film is passed over a set of serially positioned abrading rollers for the purpose of rubbing off the surfaces of the film that overlie the outermost portions of the filler particles, there is formed a multitude of fine pores extending from one film surface to the other. This technology has severe extrusion problems due to particle size requirement and hence weak properties.

U.S. Pat. No. 3,880,966 discloses a process for the manufacture of microporous films which involves the corona treatment of a nonporous, elastic starting film followed by a series of necessary steps comprised of cold stretching, hot stretching and heat setting to render to the corona treated film a microporous structure. The physical properties of these films, especially then the strength and hydrostatic pressure resistance, are not sufficiently high to utilize the films for many applications.

Also, corona treatments have been disclosed as useful in further improving the wettability and thus the liquid permeability of perforated macroporous films, such as the vacuum formed perforated films previously mentioned in U.S. Pat. Nos. 4,351,784 and 4,456,570.

It is therefore, an object of the present invention to provide a novel process for the production of a porous film which is both moisture and liquid permeable as measured by moisture vapor transmission rate and hydrostatic pressure resistance.

DESCRIPTION OF THE DRAWING

The figure shows a schematic diagram of an embodiment of the process of the present invention.

THE INVENTION

In accordance with the present invention there is provided a process for the production of an unoriented porous film which is moisture and liquid permeable which process comprises:
(a) providing an unoriented film made from a high molecular weight thermoplastic resin, said thermoplastic resin being selected from the group consisting of polyethylene, linear low density polyethylene, polypropylene, polybutylene, ethylene-propylene copolymers and mixtures thereof,
(b) passing the film through at least one set of at least two cooperating nip rollers, each nip roller being provided with an abrasive surface,
(c) withdrawing from the last set of nip rollers an unoriented abraded film having an MVTR of at least about 100 gm/m$^2$/24 hours,
(d) subjecting the abraded film from step (c) directly to at least one corona discharge treatment, and
(e) recovering an unoriented porous film having an enhanced MVTR and a decreased hydrostatic pressure resistance as compared to the values of these properties of the film step (c).

A particularly suitable resin is one comprised of from about 65 wt % to about 95 wt % of a low density polyethylene having a density in the range from about 0.910 to about 0.935 gms/cc, and at least 5 wt % of a resin component selected from the group consisting of high density polyethylene having a density exceeding about 0.940, a linear low density polyethylene of a density in the range from about 0.915 to about 0.945 gms/cc, high molecular weight polybutylene and mixtures thereof. The linear low density polyethylene is an interpolymer of ethylene and one or more $C_4$–$C_{12}$ alpha olefins. Especially preferred are the copolymers of ethylene with hexene-1 and/or octene-1. The melt index of the total resin should be between 0.5 and about 10 g/10 min.

Additives such as pigments, antioxidants, lubricants, stabilizers, etc., may also be added for their known purposes and in conventional quantities which usually is less than 4 wt % for each additive based on the weight of the resin.

The film can be produced by any known commercial process, e.g., by casting or blown film techniques. The film thickness should range between about 0.9 mil and about 6 mil. Prior to treatment according to the process of this invention, the film may be subjected to an embossment or other treatment to impart a decorative pattern onto the surface of the film.

The nip rollers each have an abrasive surface which is usually provided in the form of coating with an abrasive material such as sand paper, emery cloth, garnet paper, aluminum oxide, etc. The abrasive typically has a grit size ranging between about 80 and about 250 grain. It is not required that the entire surface of each of the rollers be covered with the abrasive. Often, the abrasive coatings are applied as cooperating strips to provide for zoned abrasion treatment areas. The film exiting the nip will as a result have abraded areas adjacent to nonabraded areas. The pressure at the nip of the rollers can vary between 10 psig and about 100 psig. The temperature is maintained at ambient conditions.

It is not necessary that a set of the cooperating nip rollers have equal roller diameters, but one roller can have a larger diameter than the other. It is also possible to have one larger roller in cooperative relationship with more than one other abrasive roller of smaller diameter. For instance, the equivalence of five serially positioned nips can be accomplished by passing the film over an abrasive nip roller partially surrounded by and in cooperative relation with five abrasive nip rollers of smaller diameter.

In passing the film through a nip section, the abrasive action of the rollers causes small pits to be formed in the surface of the film. The effective mass of the polymer is thereby reduced but not to the extent that any significant perforation of the film occurs. The porous films produced by the abrasion process step, therefore, exhibit enhanced moisture vapor transmission rates while still being impermeable to liquids as measured by the hydrostatic pressure resistance.

The abrasion treatment should be carried to produce a film having a moisture vapor transmission rate of at least 100 gm/m$^2$/24 hours. At lower than 100 MVTR the subsequent corona discharge treatment does not have any significant effect upon enhancing the rate.

The corona discharge treatment follows the abrading step directly without any intermediate hot drawing or cold drawing steps. Nor should any of these drawing operations follow the corona discharge treatment. In exposing the film to corona discharge, it is passed between at least one pair of electrodes, one of the electrodes being in the form of a grounded metallic roller or stationary bar and which cooperates with the other electrode connected to a suitable high voltage, high frequency power source. The grounded roller advantageously can be one of the nip rollers used in the previous abrasion treatment. The high voltage electrode is sized to and aligned with a corresponding abraded area of the film to be treated and is spaced parallelly from the grounded electrodes establishing a uniform air gap between the electrodes. The spacing is usually maintained below about 0.25 inches and preferably between about 0.0005 and about 0.06 inches.

The electrode receiving the high voltage operating potential may consist of a series of metal hinges having finely serrated edges evenly spaced across the width of the electrode. Alternatly, the electrode may be in the form of a series of brass brushes. The potential between the electrodes should be maintained between about 3000 and about 50,000 volts and a suitable current is between about 0.35 and about 5 amperes. The treatment is typically carried out a a frequency of from about 50 KHz to about 60 KHz.

In passing the abraded film through the high power corona discharge unit, the discharge takes the path of least resistance. As a result, holes are burned through the film in those locations where the small pits have been formed by the abrasion and the effective mass of the polymer has been decreased.

The films produced by the process of this invention permit passage of gases, vapors and liquid. The appearance of the films as measured by opacity, softness and gloss is very good. These properties make them useful in the manufacture of disposable sanitary apparel structures or assemblies, such as infant and/or adult diapers, sanitary napkins and the like, all requiring areas which are permeable to vapors and liquids. The process is especially applicable to the manufacture of end use products requiring areas of liquid permeability adjacent to areas of liquid impermeability.

Reference is now had to the figure which schematically depicts an embodiment of the process of the invention.

The plastic film 10, fed from a supply (not shown) and guided by idler rollers 11 and 12, is passed through the nip between abrasive roller 13 and the abrasive conductive roller 14, which is grounded (not shown). At 15 there is shown a hinged electrode, which is electrically connected to a suitable high frequency, high voltage power source. The electrode is spaced from the conductive roller and is parallel to the conductive roller axis thereby establishing a uniform air gap between the electrode and the film passing over the roller. The electrostatically treated film having an enhanced porous structure is guided by roller 16 to wind-up.

For a better understanding of the invention reference is had to the following examples.

EXAMPLE I

A blend was prepared from 65.0 wt. % linear low density polyethylene (0.936 density, 3.0 M.I.) 31.5 wt. % low density polyethylene (0.924 density, 0.8 M.I.) and 3.5 wt. % of a titanium dioxide whitener. A 1 mil cast film was produced from this blend and subsequently embossed to produce a patterned film having a thickness of about 2.2 mil. The embossed film was then subjected to a high power corona discharge by passing the film over a conductive roller at a speed of 400 feet per minute and using a hinged electrode connected to a high voltage power source. The electrode (Model No. 1242) was obtained from Electro Technic Products, Inc., 4644 North Ravenswood Avenue, Chicago, Ill. 060640. The spacing between the electrode and the conductive roller was about 0.002 inches. The current used in the treatment was about 1–2 amperes and the frequency about 50 KHz.

As shown in Table I, which lists the pertinent physical properties of the film prior to and after the electrostatic treatment step, the only property affected was the surface tension or wettability which resulted in a change of 5 dynes from 37 to 42. The MVTR and hydrostatic resistance was not affected.

TABLE I

| Treatment | None | Electrostatic |
|---|---|---|
| Film Thickness, mil | | |
| Initial | 1.0 | 1.0 |
| Embossed | 2.2 | 2.2 |
| MI, gms/10 min | 4.5 | 4.5 |
| Opacity, ASTM D-1003 | 46 | 46 |
| Gloss, ASTM D-2457 | 4.4 | 4.4 |

TABLE I-continued

| Treatment | None | Electrostatic |
|---|---|---|
| Elongation | | |
| MD, % | 525 | 525 |
| TD, % | 775 | 775 |
| Tensile Strength | | |
| MD, psi | 2100 | 2100 |
| TD, psi | 1500 | 1500 |
| Coefficient of Friction | 0.6 | 0.6 |
| Surface Tension, dynes | 37 | 42 |
| MVTR, gm/m²/24 hours | 45 | 45 |
| Hydrostatic Resistance, cm H₂O | 110+ | 110+ |

EXAMPLE II

The same polymer blend described in Example I was subjected to an abrasion step prior to the electrostatic treating pass. The abrasion treatment was carried out by passing the film one time through the nip of two rollers covered uniformly with 80 grit sand paper at a nip pressure of 40 psi. Each of the rollers had a length of 25½ inches and a diameter of 12 inches. the speed of each of the rollers was 400 feet per minute and the film passed through the nip at the same rate. The abraded film now having an MVTR value of 200 was then subjected to the high power corona discharge described in Example I.

As shown in Table II, which lists the pertinent physical properties of the film prior to and after the abrasion and electrostatic treatments, it can be seen that MVTR was greatly increased to a level of 650 gm/m²/24 hours while the hydrostatic resistance decreased to a level between 20 and 25 cm of water. Any values below 30 is considered liquid permeable.

However, without the prior abrasion treatment as in Example I, no change in the MVTR or hydrostatic resistance levels were noted.

TABLE II

| Treatment | None | Abrasion and Electrostatic |
|---|---|---|
| Film Thickness, mil | | |
| Initial | 1.0 | 1.0 |
| Embossed | 2.2 | 2.2 |
| MI, gms/10 min | 4.5 | 4.5 |
| Opacity, ASTM D-1003 | 46 | 46 |
| Gloss, ASTM D-2457 | 4.4 | 4.4 |
| Elongation | | |
| MD, % | 525 | 91 |
| TD, % | 775 | 50 |
| Tensile Strength | | |
| MD, psi | 2100 | 1700 |
| TD, psi | 1500 | 1000 |
| Coefficient of Friction | 0.6 | 0.6 |
| Surface Tension, dynes | 37 | 42 |
| MVTR, gm/m²/24 hours | 45 | 650 |
| Hydrostatic Resistance, cm H₂O | 110+ | 20–25 |

EXAMPLE III

A blend was prepared from 63.0 wt. % low density polyethylene (0.924 density, 0.8 M.I.), 33.5 wt. % high density polyethylene (0.967 density, 5.0 M.I.), and 3.5 wt. % of a titanium dioxide whitener. A 1 mil cast film was produced from this blend and subsequently embossed to produce a patterned film have a thickness of 2.2 mil. The embossed film was then subsequently mechanically perforated by pulling it over a back-up brush roller and perforating from above with 1.2 mil heated pins. The pin density was 100 per in².

This perforated embossed film was then subjected to the high power corona discharge treatment described in Example I.

As shown in Table III, which lists the pertinent physical properties of the perforated film prior to and after the electrostatic treatment process, it can be seen the perforation treatment alone resulted in complete liquid permeability. However, the relatively poor MVTR value of 200 did not improve with the high power corona discharge treatment.

TABLE III

| Treatment | Peforation | Perforation and Electrostatic |
|---|---|---|
| Film Thickness, mil | | |
| Initial | 1.0 | 1.0 |
| Embossed | 2.2 | 2.2 |
| MI, gms/10 min | 4.5 | 4.5 |
| Opacity, ASTM D-1003 | 46 | 46 |
| Gloss, ASTM D-2457 | 4.4 | 4.4 |
| Elongation | | |
| MD, % | 90 | 90 |
| TD, % | 50 | 50 |
| Tensile Strength | | |
| MD, psi | 1700 | 1700 |
| TD, psi | 1000 | 1000 |
| Coefficient of Friction | 0.6 | 0.6 |
| Surface Tension, dynes | 37 | 42 |
| MVTR, gm/m²/24 hours | 200 | 200 |
| Hydrostatic Resistance, cm H₂O | 0 | 0 |

Examples I–III demonstrate the unique capability of the process of the invention to form pores in a plastic film or article which are permeable to both vapor and liquids. This is achieved by first decreasing the mass of the polymer in selected small areas by an abrasion treatment and subsequently subjecting it to a high power corona discharge treatment, which via the path of least resistance burns small pores in the plastic in the areas of reduced mass. These results cannot be achieved if a straight through pore is formed by any penetration means prior to the electrostatic treatment.

It is to be understood that many alterations and modifications can be made to the process in this invention. All such departures are considered within the scope of this invention as defined by the specifications and appended claims.

What is claimed is:

1. A process for the production of an unoriented porous film which is moisture and liquid permeable, which process comprises:
   (a) providing an unoriented film made from a high molecular weight thermoplastic resin, said thermoplastic resin being selected from the group consisting of polyethylene, linear low density polyethylene, polypropylene, polybutylene, ethylene-propylene copolymers and mixtures thereof;
   (b) forming small pits in the surface of the film without causing formation of straight through pores by passing the film through at least one set of at least two cooperating nip rollers, each nip roller being provided with an abrasive surface;
   (c) withdrawing from the last set of nip rollers an unoriented abraded film having an MVTR of at least about 100 gm/m²/24 hours;
   (d) subjecting the abraded film from step (c) directly to at least one corona discharge treatment, and
   (e) recovering an unoriented porous film having an enhanced MVTR and a decreased hydrostatic pressure resistance as compared to the values of these properties of the film of step (c).

2. The process of claim 1 wherein each of the nip rollers are partially covered with cooperating abrasive surfaces to produce a film having abraded areas and subjecting said abraded areas to at least one corona discharge treatment.

3. The process of claim 1 wherein the pressure at the nip of the rollers is between about 10 and about 100 psig.

4. The process of claim 1 wherein the abrasive has a grit size between about 80 and about 250 grain.

5. The process of claim 1 wherein the potential between the electrodes is maintained between about 3000 and about 5000 volts.

6. The process of claim 1 wherein the corona discharge treatment is carried out using a current between about 0.5 and about 5 amperes.

7. The process of claim 1 wherein the corona discharge treatment is carried out at a frequency between about 50 and about 60 KHz.

8. The process of claim 1 wherein the resin is comprised of from about 65 wt. % to about 95 wt. % of a low density polyethylene having a density in the range from about 0.910 to about 0.935 gm/cc and at least 5 wt. % of a resin component selected from the group consisting of high density polyethylene having a density exceeding about 0.940, a linear low density polyethylene having a density in the range from about 0.915 and about 0.945, a high molecular weight polybutylene and mixtures thereof.

* * * * *